(12) United States Patent
Chung et al.

(10) Patent No.: US 8,913,131 B2
(45) Date of Patent: Dec. 16, 2014

(54) LOCOMOTIVE WIRELESS VIDEO RECORDER AND RECORDING SYSTEM

(75) Inventors: Wing Yeung Chung, Erie, PA (US); Daniel Malachi Ballesty, Wattsburg, PA (US); Glenn Robert Shaffer, Erie, PA (US); Jeffrey James Kisak, Erie, PA (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 13/109,209

(22) Filed: May 17, 2011

(65) Prior Publication Data

US 2011/0216200 A1    Sep. 8, 2011

Related U.S. Application Data

(60) Division of application No. 11/146,831, filed on Jun. 6, 2005, now Pat. No. 7,965,312, which is a continuation-in-part of application No. 10/361,968, filed on Feb. 10, 2003, now abandoned.

(60) Provisional application No. 60/626,573, filed on Nov. 10, 2004, provisional application No. 60/385,645, filed on Jun. 4, 2002.

(51) Int. Cl.
| | |
|---|---|
| H04N 7/18 | (2006.01) |
| B61L 25/02 | (2006.01) |
| B61L 27/00 | (2006.01) |
| B61L 15/00 | (2006.01) |
| H04L 29/08 | (2006.01) |

(52) U.S. Cl.
CPC ............. *B61L 25/021* (2013.01); *B61L 25/023* (2013.01); *B61L 27/0088* (2013.01); *B61L 25/026* (2013.01); *B61L 2205/04* (2013.01); *H04N 7/183* (2013.01); *B61L 15/0081* (2013.01); *B61L 27/0094* (2013.01); *B61L 25/025* (2013.01); *H04L 67/12* (2013.01); *B61L 15/0027* (2013.01); *B61L 15/009* (2013.01)
USPC ......................................................... 348/148

(58) Field of Classification Search
CPC .... B60R 1/00; B60R 11/04; B60R 2300/802; H04N 7/181
USPC ...................... 348/82–86, 115–120, 142–160
See application file for complete search history.

(56) References Cited

U.S. PATENT DOCUMENTS

| | | | |
|---|---|---|---|
| 3,505,742 A | 4/1970 | Fiechter | |
| 3,864,039 A | 2/1975 | Wilmarth | |
| 4,259,018 A | 3/1981 | Poirier | |

(Continued)

FOREIGN PATENT DOCUMENTS

| | | |
|---|---|---|
| EP | 0378781 A1 | 7/1990 |
| EP | 0953491 A1 | 11/1999 |

(Continued)

*Primary Examiner* — Andy Rao
(74) *Attorney, Agent, or Firm* — GE Global Patent Operation; John A. Kramer (57) ABSTRACT

An imaging system for generating images taken from a rail vehicle, the system including a camera configured to generate video data associated with a rail vehicle, and a processor configured to control recording of video data according to at least one of a variable frame rate or a variable resolution based on operating conditions of the rail vehicle. A method and non-transitory computer readable medium with instructions are also included.

20 Claims, 5 Drawing Sheets

(56) References Cited

U.S. PATENT DOCUMENTS

| | | |
|---|---|---|
| 4,490,038 A | 12/1984 | Theurer et al. |
| 4,654,973 A | 4/1987 | Worthy |
| 4,751,571 A | 6/1988 | Lillquist |
| 4,783,593 A | 11/1988 | Noble |
| 4,915,504 A | 4/1990 | Thurston |
| 5,203,089 A | 4/1993 | Trefouel et al. |
| 5,978,718 A | 11/1999 | Kull |
| 6,011,901 A * | 1/2000 | Kirsten .................. 386/226 |
| 6,088,635 A | 7/2000 | Cox et al. |
| 6,128,558 A | 10/2000 | Kernwein |
| 6,356,299 B1 | 3/2002 | Trosino et al. |
| 6,532,038 B1 | 3/2003 | Haring et al. |
| 6,570,497 B2 | 5/2003 | Puckette et al. |
| 6,600,999 B2 | 7/2003 | Clark et al. |
| 6,647,891 B2 | 11/2003 | Holmes et al. |
| 6,778,284 B2 | 8/2004 | Casagrande |
| 6,995,556 B2 | 2/2006 | Nejikovsky et al. |
| 7,463,348 B2 | 12/2008 | Chung |
| 7,616,329 B2 | 11/2009 | Villar et al. |
| 7,742,873 B2 | 6/2010 | Agnew et al. |
| 7,845,504 B2 | 12/2010 | Davenport et al. |
| 7,965,312 B2 | 6/2011 | Chung et al. |
| 7,999,848 B2 | 8/2011 | Chew |
| 8,180,590 B2 | 5/2012 | Szwilski et al. |
| 8,233,662 B2 | 7/2012 | Bhotika et al. |
| 8,335,606 B2 | 12/2012 | Mian et al. |
| 8,405,837 B2 | 3/2013 | Nagle, II et al. |
| 8,412,393 B2 | 4/2013 | Anderson et al. |
| 8,599,005 B2 | 12/2013 | Fargas et al. |
| 8,712,610 B2 | 4/2014 | Kumar |
| 8,744,196 B2 | 6/2014 | Sharma et al. |
| 2003/0048193 A1 | 3/2003 | Puckette et al. |
| 2003/0142297 A1 | 7/2003 | Casagrande |
| 2005/0018748 A1 | 1/2005 | Ringermacher et al. |
| 2006/0017911 A1 | 1/2006 | Villar et al. |
| 2011/0216200 A1 | 9/2011 | Chung et al. |
| 2012/0192756 A1 | 8/2012 | Miller et al. |
| 2012/0300060 A1 | 11/2012 | Farritor |
| 2013/0191070 A1 | 7/2013 | Kainer et al. |

FOREIGN PATENT DOCUMENTS

| | | |
|---|---|---|
| EP | 1236634 A1 | 9/2002 |
| EP | 1600351 A1 | 11/2005 |
| WO | 2006112959 A2 | 10/2006 |

* cited by examiner

LOCOMOTIVE WIRELESS VIDEO RECORDER AND RECORDING SYSTEM

CROSS-REFERENCE TO RELATED APPLICATIONS

This application is a divisional of application Ser. No. 11/146,831, filed Jun. 6, 2005, since issued as U.S. Pat. No. 7,965,312, which claims the priority and benefits of U.S. Provisional Application No. 60/626,573, filed Nov. 10, 2004, which is a continuation-in-part of U.S. application Ser. No. 10/361,968, filed Feb. 10, 2003 now abandoned, which claims the priority and benefits of U.S. Provisional Application No. 60/385,645, filed Jun. 4, 2002, each of which is incorporated herein by reference in its entirety.

BACKGROUND OF THE INVENTION

The invention relates to integrated diagnostic, telemetry and recording systems for use in a locomotive. Event recorders exist for use with locomotives. Such event recorders receive data corresponding to numerous parameters such as speed, acceleration, etc., from the locomotive control system over a communications channel (e.g., RS 422 interface). Upon the occurrence of an event the event recorder stores locomotive data in a memory module. An exemplary locomotive event recorder is produced by Electrodynamics, Inc.

Locomotive audio/video recording systems are also known in the art. An exemplary locomotive audio/video recording system is the RailView™ system available from Transportation Technology Group. In such audio/video recording systems, video data and optionally audio data are stored to a high capacity, memory device such as a floppy disk drive, hard disk drive or magnetic tape.

Another locomotive video system is disclosed in U.S. Pat. No. 5,978,718 for use in rail traffic control. For trains traveling on a route equipped with a wayside signaling system, the operating authority guides each train via wayside signal devices dispersed at various intervals throughout the length of the railway route. Though trains can be guided safely along unsignaled routes, wayside signaling systems are preferable, especially on heavily trafficked routes, as they can be used to guide trains even more safely and more quickly along such signaled routes with less distance between them. In the video system of the '718 patent, a rail vision system is employed to visually read signal aspect information from each wayside signal device of a wayside signaling system. The system can be configured to warn a train operator of the more restrictive signal aspects and impose brake application should the train operator fail to acknowledge the warning. The rail vision system includes a signal locating system and a rail navigation system. The rail navigation system determines the position that the train occupies on the railway track and provides the signal locating system with data as to the whereabouts of the upcoming wayside signal device relative to the position of the train. The signal locating system locates upcoming wayside signal devices and reads the information therefrom as the train approaches. The signal locating system provides the information read therefrom to the rail navigation system. The rail navigation system can then warn the train operator of restrictive signal aspects, and, should the train operator fail to acknowledge the warning, impose a brake application.

BRIEF DESCRIPTION OF THE INVENTION

Exemplary embodiments of the invention provide for an imaging system, method, and non-transitory computer readable medium with instructions for generating images taken from a rail vehicle. The system comprises a camera configured to generate video data associated with a rail vehicle, and a processor configured to control recording of video data according to at least one of a variable frame rate or a variable resolution based on operating conditions of the rail vehicle.

The method comprises generating video data associated with a rail vehicle with a camera, and controlling recording of video data according to at least one of a variable frame rate or a variable resolution based on operating conditions of the rail vehicle with a processor.

The non-transitory computer readable medium with instructions, that when executed by a processor, cause the processor to control recording of video data associated with a rail vehicle at one of a variable frame rate or a variable resolution based on operating conditions of the rail vehicle.

DETAILED DESCRIPTION OF THE INVENTION

Disclosed herein is a locomotive video recorder and recording system comprising a combination of video technologies, wireless information systems, and locomotive transportation systems which enable configurable event based, image and parameter data recording, remote monitoring, and diagnostic services that aid in resolving various railroad transportation issues. The inventors of the present invention have innovatively discovered that by logging recorded information with one or more data tags, such as tags indicative of chronological time, operating conditions, and/or locations, improved data functionality may be achieved.

Figure 1:
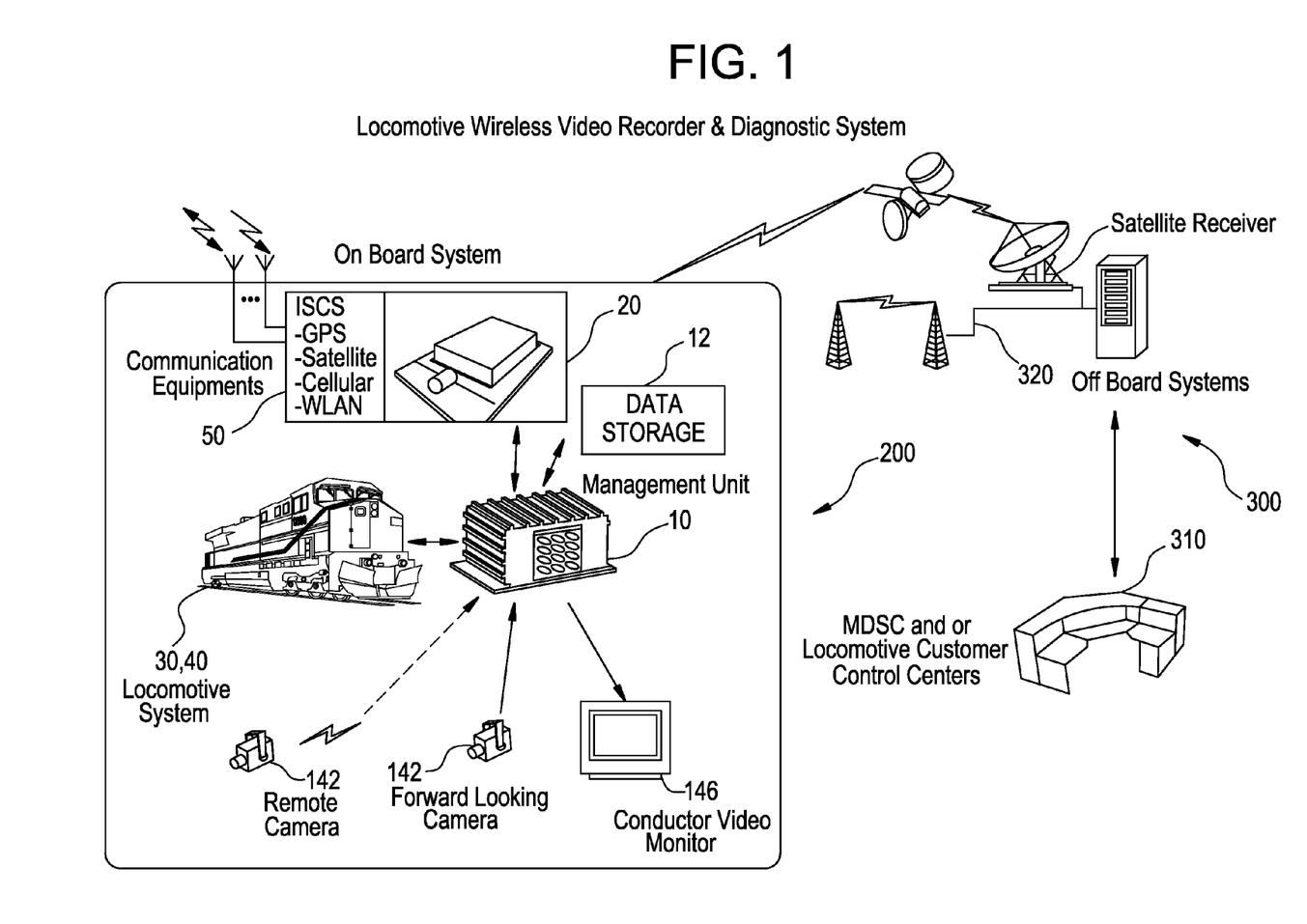
FIG. 1 is a block diagram of an exemplary locomotive video recorder and recording system in accordance with an exemplary embodiment of this invention.

Referring to FIG. 1, the locomotive video recorder and recording system shown generally as 5 comprises an on-board group of systems 200 and "off-board" systems 300. An event recorder functionality includes recording and transmitting relevant video, geographic data, and locomotive operating parameters to assist in resolving issues related to RR crossing accidents, train derailments, collisions, and wayside equipment inspection and maintenance. In addition, this video recorder and recording system 5 can be used to perform remote monitoring and diagnostics of track conditions, wayside equipment, and operator train management.

The data collection, processing, and wireless transmission provided by the locomotive wireless video recorder and recording system 5, enable a user to quickly respond to issues that occur in and around the many locomotives moving throughout a railroad network. Event data transmission may be configured to occur based on various locomotive conditions, geographic locations, and situations. In addition, event data may be either pulled (requested) or pushed (transmitted)

from the locomotive. For example, data can be sent from a locomotive to an off-board data and monitoring center 310 based on selected operating conditions (e.g., emergency brake application), geographic location (e.g., in the vicinity of a railroad crossing), selected or derived operating areas of concern (e.g., high wheel slip or locomotive speed exceeding area limits), or time driven messages (e.g., sent once a day). An off-board central monitoring and data center 310 may also request and retrieve the data from specific locomotives on demand.

Wireless communication connectivity also enables the off-board data and monitoring center 310 to provide additional functions including remote monitoring and diagnostics of the system and remote configuration management of the mobile on-board systems 200.

Figure 2:
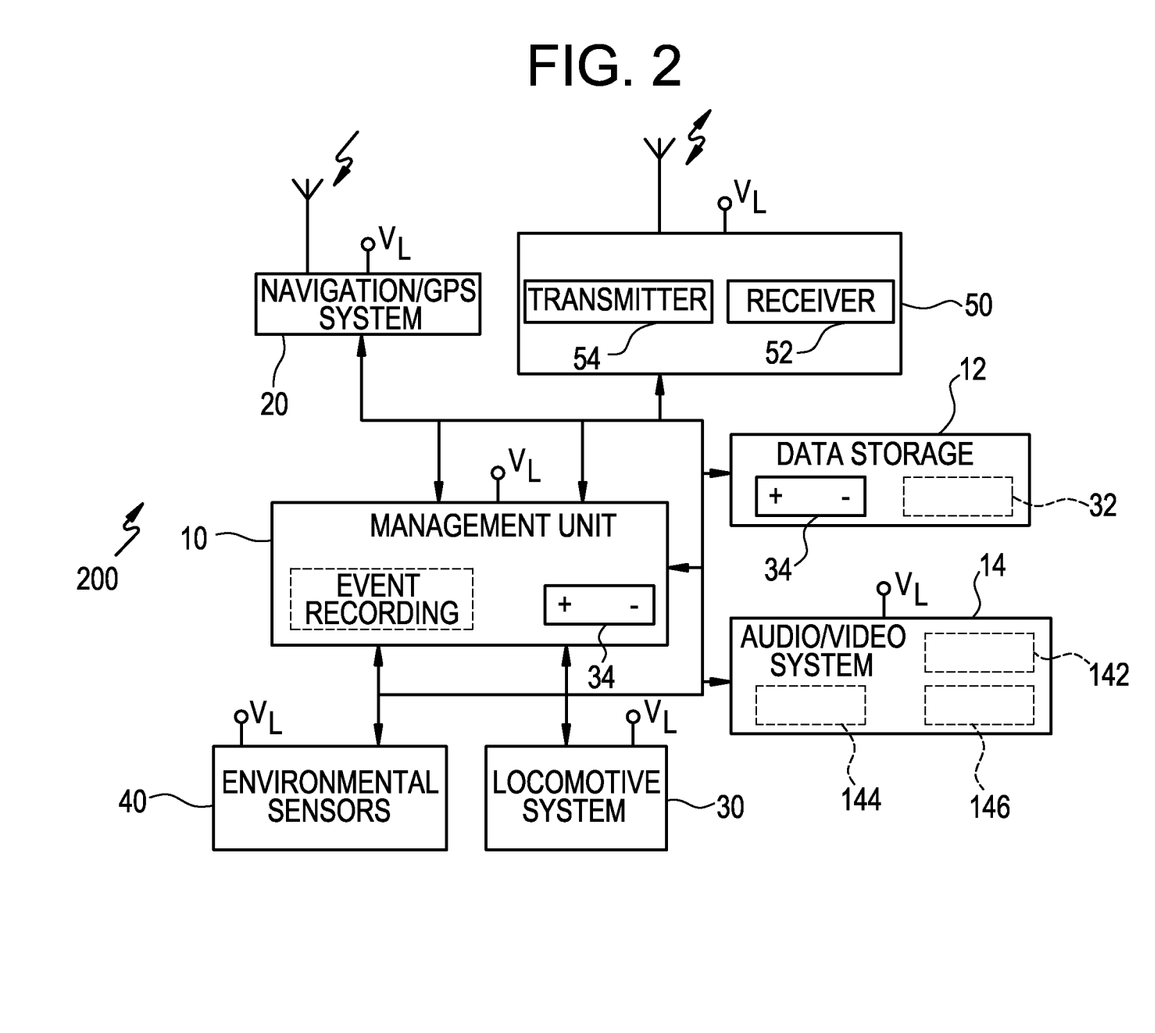
FIG. 2 is a block diagram depicting an exemplary on board system with an integrated diagnostic, telemetry and recording system.

FIG. 2 is a block diagram depicting an exemplary on board system 200 with integrated diagnostic, telemetry, and video recording system 5 hereinafter denoted system 5. The system 5 includes a management unit or processor, hereinafter denoted management unit 10, which provides command and control of various interfaces and processes as may be accomplished. In addition, the management unit 10 may further include diagnostics and event recording capabilities. Event recording, for example, determines selected parameters to observe, evaluate, and if desired save or record.

Figure 3:
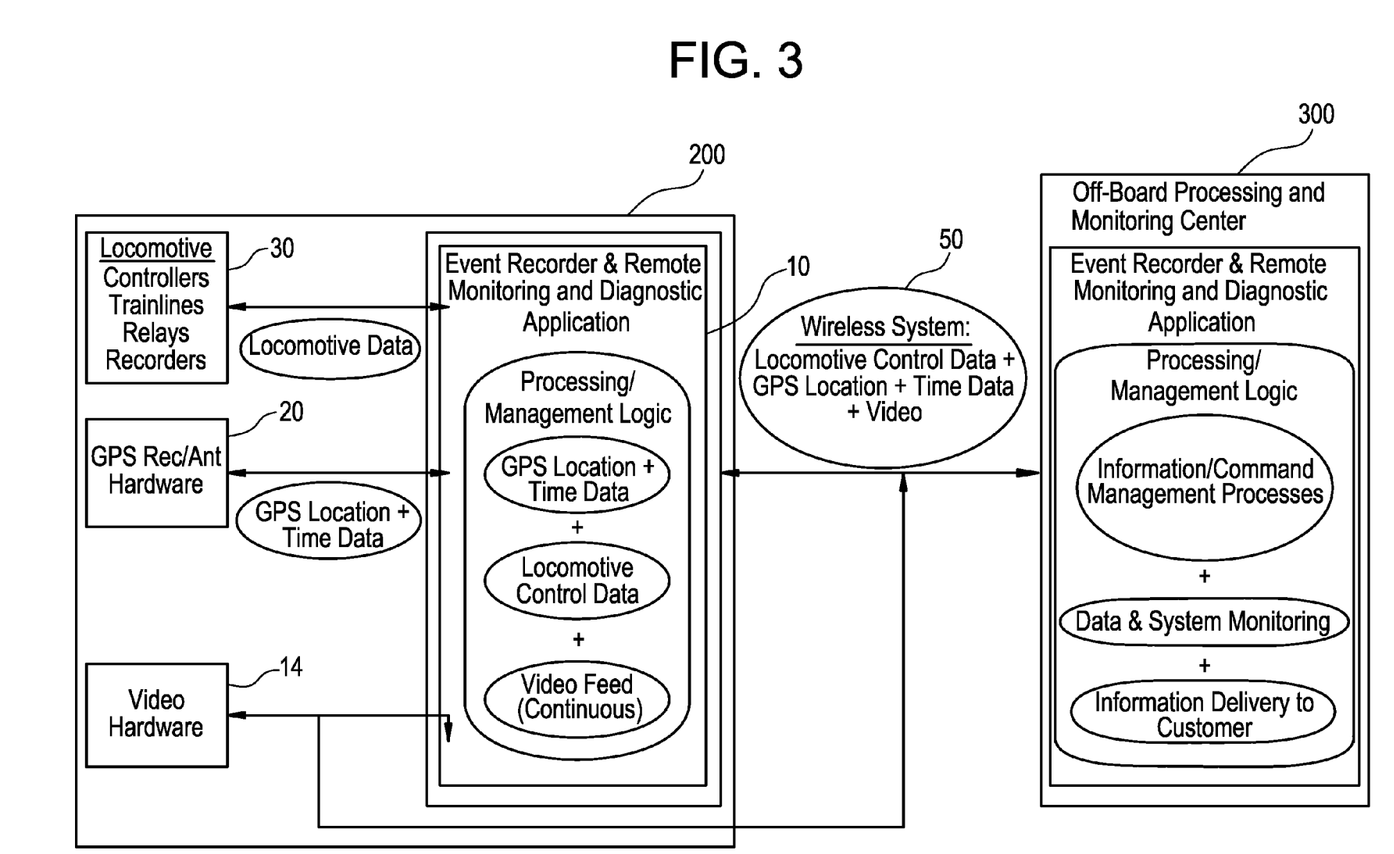
FIG. 3 depicts an exemplary data flow diagram of an exemplary locomotive video recorder and recording system.

The management unit 10 may include, without limitation, a computer or processor, logic, memory, storage, registers, timing, interrupts, and the input/output signal interfaces as required to perform the processing prescribed herein. The management unit 10 receives inputs from various sensors and systems and generates output signals thereto. FIG. 3 depicts the top-level block diagram of the processing functions and data flow of the integrated diagnostic, telemetry and recording system 5. It will be appreciated that while in an exemplary embodiment most processing is described as resident in the management unit 10, such a configuration is illustrative only. Various processing and functionality may be distributed among one or more system elements without deviating from the scope and breadth of the claims.

In an exemplary embodiment, the management unit 10 performs or facilitates the following processes:

Collection of data from various inputs (video, GPS, locomotive data);

Processing of data;

Recordation and Storage of data;

Logical computations to determine appropriate system actions (send data, file management, video controls);

Control of video equipment (on/off, time and location activation, image quality settings, etc);

Association of audio/video data with parameter and event data;

Interfaces with the wireless network;

Processes commands from the off-board data and monitoring center; and

System diagnostics and health status.

The event recording capability of the management unit 10 receives locomotive data from the locomotive system 18 including, but not limited to acceleration, speed, direction, braking conditions, wheel slip and the like. The management unit 10 and/or a data storage 12 may continually direct and facilitate the storage of various locomotive data in the data storage 12 on a first-in, first-out basis. This allows the system to capture locomotive data leading up to an event. Alternatively, the management unit 10 may initiate storing locomotive data in the data storage 12 upon detection of an event or via operator control on-board the locomotive or from a off-board data and monitoring center 310. Detection of an event is performed using known techniques (e.g., vehicle sensors, such as accelerometers, speed sensors, locomotive operational sensors, and the like).

The management unit 10 in performing the abovementioned processes may utilize various signals along with and in comparison to a database of stored information (described below). The database 32 may be employed to facilitate correlation of selected data with a selected or specified events. Moreover, the database 32 may be employed to identify a type of event or events and a selected set of images, operational parameter, or environmental parameter data that is preferably associated or relevant to such an event. The database 32 may be utilized, for example, to determine not only the position that the train occupies on the railway track but also the location relative to the position of the train of an upcoming target of interest or desired input for event and video recording such as a wayside signal device, crossing, bridge, curve in the track, and the like. This information may be used to determine gating of sensors, or the cameras 142 of the audio/video system 14. For example, in an exemplary embodiment, the management unit 10 determines where the train is located in relation to the track route location data stored in the abovementioned onboard database 32. Through such processing, the geographical coordinates of the train may be compared with the abovementioned database information to determine not only on which track the train is traveling but also the particular segment and position that the train occupies on that track.

When the management unit 10 has determined or established the expected location and position of a desired input, e.g., upcoming crossing, wayside signaling device, and the like, the management unit 10 may optionally direct the audio video system 14 and the sensing means 142, e.g., camera or particular camera to focus on the upcoming desired input, for example, an up coming wayside signal device. Additionally, the management unit 10 may direct recordation of selected parameters related to the operation of the locomotive or environmental parameters and data. These data may then readily be associated with selected video data to provide detailed insight into the operation of the locomotive and past events.

In another exemplary embodiment, the management unit 10 may be employed to facilitate operation of an on-board system diagnostics and health monitoring for the system 5, or components thereof. For example, in an exemplary embodiment, the management unit 10, data storage 12 and a communication system 50 may be employed to detect, store, and transmit to the off-board central data center 310 relevant operating system parameters and information such as diagnostics and/or failure of the management unit 10, data storage or other components of the system 5. The diagnostics may further identify component status, and failure or inoperability including, but not limited to, loss of power loss or operation of the audio/video system 14 and components thereof, loss of imaging data, time, and location of failures.

The on-board systems 200 may also include data storage 12. The data storage 12 is configured to exhibit sufficient capacity to capture and record data to facilitate performance of the functions disclosed herein. The data storage 12 provides of suitable storage capacity, such as 2 gigabytes of memory in a exemplary embodiment. In one embodiment, the data storage 12 uses flash memory. Data storage 12 may also include non-volatile random access memory (RAM). Moreover, as part of the data storage 12, in one configuration, the management unit 10 may include non-volatile memory for storage of diagnostic and status data.

As shown in FIG. 2, the data storage 12 includes a housing 13, with the housing preferably protecting a data storage device 12 against mechanical and electrical damage during an event (e.g., selected locations, operating conditions, or an accident involving the locomotive) to preserve data held in data storage device 12. The data storage device 12 is preferably a solid-state, non-volatile memory of sufficient storage capacity to provide long-term data storage of the locomotive data, environmental data, video data and audio data for a significant period of time (e.g., 15 minutes) associated with a selected event. Once again, it will be appreciated that while the data storage device 12 are described herein as separate entities from the management unit 10 either or both could be configured to be separate or combined, as well as being combined with other elements of the system 5 disclosed herein. Additionally it should be appreciated the while a particular partitioning of the processing and functionality is disclosed herein, such partitioning is illustrative only to facilitate disclosure. Many other arrangements and partitions of like functionality may now readily be apparent.

The data storage 12 may also utilized to store a database 32 composed of a variety of information that may be used in conjunction with data and parameters acquired. In particular, the database may be employed to correlate acquired data with a selected event or events. For example, the database may be employed in cooperation with a navigation system 20, for example, a Global Positioning System (GPS) to facilitate position determination, localizing, and determination or evaluation for gating of data and video recording functions as a function of position, location, time, wayside status, and the like, as well as combinations including at least one of the foregoing. The database may include data including, but not limited to: (i) the locations of railway track routes, and track mapping (ii) the locations and orientations of curves and switches in those railway track routes, (iii) the location of each wayside device on each railway track route, (iv) the type of each wayside device (e.g., crossing gates, switches, signals, background shape, number of lights, possible color combinations), (v) the direction which each wayside device points (e.g., eastbound or westbound, etc.) and the particular track to which each wayside device relates (e.g., main track or siding), (vi) the position of each wayside device with respect to the particular track and the direction which the train is traveling (e.g., to the right, left, overhead), (vii) the distance from each wayside device at which imaging of the object should start, and (viii) the operation of the wayside device (e.g., lights are operating, horn or bell is operating, the crossing gate arms are moving etc.). As explained below, the database may also feature data pertaining to (x) the location of every highway or other type of crossing on all relevant railway track routes and (xi) the distance from each crossing at which imaging should start. This location data is pegged to the identity of each railway route typically by reference to milepost distances. Moreover, the database may include various operational and environmental parameters associated with a various types of events. The database 32 may be employed to identify a for particular type of event, the environmental and operational parameter data that would be relevant to a selected event.

Coupled to the data storage 12, and optionally to the management unit 10 is an audio/video system 14. The audio/video system 14 generates audio data and video data that is either stored directly in the data storage 12 or stored in coordination with operational and environmental parameter data available in the system 5. In an exemplary embodiment, the audio/video system 14 acquires digital audio and digital video information. However, optionally analog equipment may be employed. The audio/video system 14 includes one or more cameras and/or microphones directed as desired to obtain desired video and audio information. The audio/video system 14 includes a input or sensing means 142 that can for example, take the form of any one of a variety of known cameras and/or microphones including the types of cameras that feature aiming and zooming mechanisms that can be externally controlled to aim the camera at an upcoming object with high clarity even at relatively long distances. Further, in an exemplary embodiment, a sensing means 142 with control of lighting effects, resolution, volume control for audio, frequency of imaging, data storage, and information concerning audio/video system parameters may be utilized. The sensing means 142 e.g., camera and/or microphone, is used to generate a video signal indicative of an image of the object, such as an upcoming wayside device, crossing, or track conditions onto which it is focused. Additionally, the audio/video system 14 and more particularly the sensing means 142 may further take advantage of video technologies that facilitate low/no light image collection or collection of specific images. For example infrared and detection of specific images, e.g., flashing red crossing lights.

The audio/video system 14 may also include a processing means 144 that may take the form of any one of several types of hardware and software embodiments known in the signal processing art for handling and processing the captured data. Using any number of well established signal processing techniques, the processing means 144 is to be used to process the video signals generated by the sensing means e.g., camera(s) and/or microphones 142 so that the upcoming wayside signal device, the signal aspect information therefrom, crossing, or track conditions, is rendered discernable. The particular techniques and hardware/software implementation selected for the processing means 144 is well known and a function of desired capabilities, characteristics, cost, and the like.

The audio/video signal generated by the sensing means 142 e.g., camera and/or microphone may be processed by the processing means 144 in an attempt to render the upcoming desired input, as well as any information appearing thereabout, discernable. Further, the processing may include a determination of characteristics of the upcoming desire input, for example, particular signal information, crossing status or obstruction, crossing gate status, crossing gate light status, crossing gate audible warning, and the like.

The sensing means 142 e.g., camera(s) and/or microphone (s) may be directed out the front of the locomotive. Additionally, sensing means 142 may be directed to either side, or to the rear of the locomotive or multiple cameras may be used to capture images from multiple areas. Such a configuration preserves a visual record of the wayside signaling information, crossing status, and items on or near the track in the event of a mishap. Moreover, and in conjunction with the event and data recording capability of the management unit 10, the video data may be captured and stored in a universal time-tagged manner with other locomotive parameters, such as diagnostics, and locomotive operational characteristics and parameters to facilitate incident investigation and operator evaluation. Additionally, one or more microphone(s) may be employed to record audio such as, wayside equipment lights, sound and operation, locomotive operational sounds, or the application of the locomotive horn.

The audio/video system 14 may optionally feature a display unit 146 to show the train operator a wide variety of data intelligence gathered or information to facilitate operation or diagnostics of the locomotive. The display unit 146 may feature selected video data and operational parameters including, but not limited to, wayside signal aspects, speed, power and the like. The display unit 146 may also feature a graphical display used to provide the train operator with the actual video image generated by the camera(s) 142. It may also be used to display supplemental information such as the profile of the upcoming portion of railway track, the estimated distance required to brake the train, the territorial coverage of the railway operating authority or other data, and the like.

The audio/video system 14 may also be used to detect and react to obstructions on the railway track. This configuration would assist operators of trains that travel along railway routes that intersect with highways or other types of railway track crossings.

The video data and audio data (if used) may be stored continuously in the data storage 12 on a first-in, first-out basis employing a continuous looping approach. Upon occurrence of an event, the audio/video data is preserved in data storage 12. This enhances the ability to determine the cause of an event. The capacity of the data storage 12 can be increased as required to store additional audio/video data or locomotive data. Again, this allows the management unit to direct the recording of a predetermined amount of video/audio data leading up to an event. Alternatively, the audio/video system 14 may be configured to initiate imaging/observing, and transmitting video/audio data to the data storage 12 for recordation upon detection of an event, selected event, or based upon operational and environment parameters and the like.

By collecting locomotive data, audio/video data, and environmental data, and the like in data storage 12, the integrated diagnostic, telemetry and video recording system 5 facilitate analysis of locomotive events. The addition of environmental and locomotive operating parameter data stored in the same data storage 12 simplifies configuration of the system 5, integration, and further enhances the ability to investigate locomotive events. Moreover, as disclosed herein, linking the storage and event or data recording capabilities as disclosed with a remotely configurable communications system 50 further facilitates data capture, analysis and incident investigation as may be directed by an off-board data and monitoring center 310.

Continuing now with FIGS. 1 and 2, the integrated diagnostic, telemetry and video recording system may further include a communications system 50 integrated with data storage 12 and optionally the audio/video system 14 and management unit 10. In an exemplary embodiment, the communications system 50 includes multiple communications systems employed as may facilitate a particular communication or environment including, but not limited to wireless satellite communications system, a cellular communications system, radio, private networks, a Wireless Local Area Network WLAN, and the like, as well as combinations including at least one of the foregoing. In an exemplary embodiment, the wireless communication system may be employed to transmit image data, environmental and operational parameter data corresponding to a selected event or events to the off-board data and monitoring center 300.

The wireless communication system 50 may comprise an onboard receiver 52 and transmitter 54. The wireless communication system 50 provides a means to transmit the data between locomotives and from the locomotive to an off-board processing center 300. Optionally, the wireless communications system may be employed for communication to the system 5 for diagnostics, data downloads, uploads and the like. Additionally, the wireless communication system 50 provides a means to receive commands and requests from the off-board processing center 300. For example commands pertaining to transmission protocol, channel, transmission format, transmission timer, packet size, frequency, and the like as well as combinations including at least one of the foregoing. Moreover, data may also be retrieved from the locomotive mounted management unit 10 via manual (wired) interfaces and downloads to another computer or even management unit 10 memory removal.

Continuing once again with FIGS. 1 and 2, the integrated diagnostic, telemetry and video recording system 5 may further include a navigation system 20. The navigation system 20 may be employed to determine the position of the train/locomotive occupies on the globe. In an exemplary embodiment, the navigational system takes the form of a Global Positioning System hereinafter GPS, which can receive signals and determine global coordinates, such as latitude and longitude, directional information, velocity and time. The GPS provides geographic, movement, and time data to the management unit 10 to facilitate correlation of selected image, operational and environmental parameter data with a chronological time and/or geographic location. Time tag data may include, but not be limited to, chronological time, time of transmission and the like. Geographic data may include, but not be limited to, latitude, longitude, velocities and the like. In an exemplary embodiment, the GPS system includes, but is not limited to a locomotive mounted antenna and receiver/computer that processes signals from low earth orbiting satellites to provide the abovementioned data.

In an exemplary embodiment, the GPS receiver should preferably be accurate enough to identify a curve or a switch on which the train is located. Thus, the data that the GPS receiver itself may provide may only be an approximation of the exact position of the train. The GPS may further be coupled with other navigational aids to further facilitate accurate position location and determination. The GPS information may further be coupled with the stored information about the track to further facilitate a determination of where the locomotive, (and thereby the train) is on the track relative to fixed waypoints or entities, for example a wayside signaling device or crossing.

The locomotive system 30 includes, but is not limited to, various sensor and data sources that provide inputs to the data storage 12 and/or management unit 10. One source is the locomotive control system that provides data about the operational performance and status of the locomotive. For example, data on power commands, engine speed, locomotive speed, traction feedback, pneumatic brakes, brake pressures, dynamic braking, load, throttle, operating faults, ambient temperature, commanded parameters and the like. Another data source is the locomotive "trainlines"—these (discrete) signals run between locomotives in a train and provide operation status of the locomotive. For example, the "trainlines" include data on operator's power/brake command, direction call, power mode, and the like. Moreover, data can also be collected directly from various locomotive and environmental sensors 40, control circuits and devices, e.g., track geometry monitors, smoke and fire detectors, chemical or fuel detectors, engine on relay and emergency brake relay or other data collection devices, such the data event recorder, locomotives horn and bell indication and the like. Other environmental and operational parameters that may be observed and recorded may include but not be limited to: weather conditions, e.g., rain, snow, fog, and the like; horn and lights, track conditions, track topology, elevation direction and heading.

Returning to FIGS. 1 and 2, the off-board data processing center 300 interfaces with the wireless communication system and manages the files and commands to and from the locomotives. The off-board data processing center 300 employs a wireless communications system 320 to interface with on-board systems. The wireless communication system 320 may include but not be limited to a transmitter and receiver for satellite communications, radio, cellular, and the like, as well as combinations including at least one of the foregoing. The off-board data processing center 300 processes the data into valuable data for the users. A monitoring and diagnostic service center (MDSC) 310 processes the data collected by the system and provides the event replay services and diagnostic recommendations. The MDSC also uses the system to perform remote monitoring of the locomotive and surrounding elements such as the rail, signaling, and crossing equipment. The MDSC 310 with the communications system 320 transmits request to the on board systems 200 for selection of desired images, environmental and operational parameter data. Advantageously, the system may be employed to select specified data to be stored and/or transmitted to the off-board MDSC 310 under selected conditions such as when the locomotive approaches or reaches a desired location, wayside signaling device, at a specified time, and the like. The MDSC 310 may also be employed to remotely modify the configuration of the onboard communications system 50 The MDSC also monitors the health of the audio/video system 14, locomotive system 30, navigational system 20, and a wireless communications system 50 and performs required maintenance (e.g., hardware and software version tracking). Raw data and diagnostic recommendations are exchanged with various customers by the MDSC via web pages or business-to-business file transfers.

The management unit 10, data storage 12, audio/video recording system 14, communications system 50 navigation system 20, locomotive control system 18 and environmental sensors 40 may be powered during normal operation from a locomotive power supply $V_L$. The source of locomotive power supply $V_L$ may be a generator driven by the locomotives engine. The management unit 10, data storage 12, audio/video recording system 14, communications system 50, and navigation system 20, may optionally include auxiliary power supplies such as batteries 34. During failure or disruption of the locomotive power supply $V_L$, auxiliary power supplies 34 are utilized to facilitate continued operation. Alternatively, instead of separate auxiliary power supplies for each component, an auxiliary power supply could supplement locomotive power supply $V_L$ in the event of a failure or disruption locomotive power supply $V_L$ to supply selected components of the system 5. In an exemplary embodiment, the data storage 12 and audio/video recording system 14 may be powered with auxiliary power supplies 34. Optionally, the management unit 10, communications system 50 navigation system 20, locomotive control system 18 and environmental sensors 40 may also be powered with one or more auxiliary power supplies 34.

Figure 4:
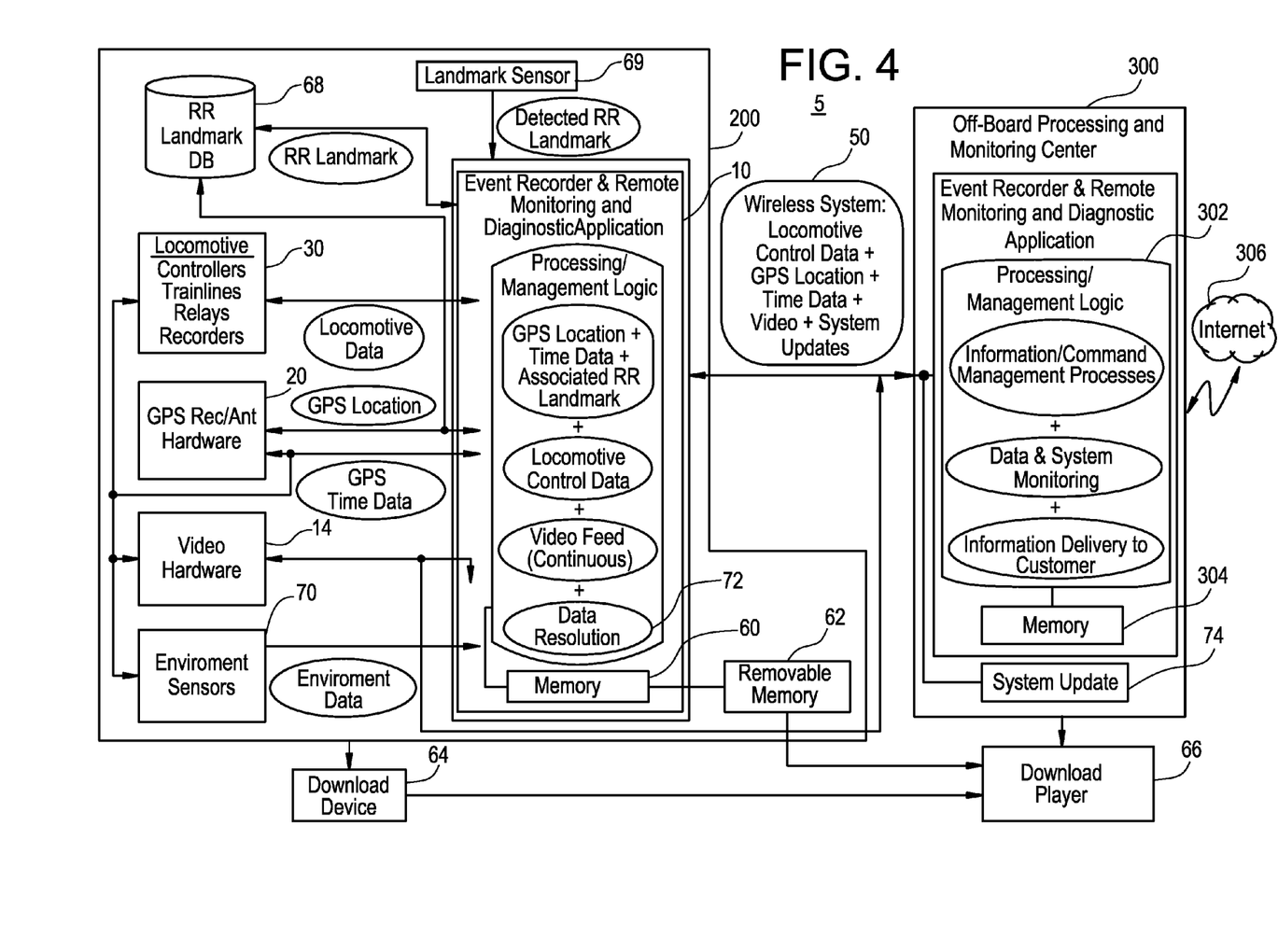
FIG. 4 depicts an exemplary data flow diagram of another embodiment of an exemplary locomotive video recorder and recording system.

FIG. 4 depicts an exemplary data flow diagram of another embodiment of an exemplary locomotive video recorder and recording system 5. The system 5 may include the on-board system 200 comprising the management unit 10 receiving data from the audio/video system 14, the locomotive system 30, and the navigational system 20. The wireless communications system 50 provides two-way communication between the on-board system 200 and the off-board data processing center 300. The on-board system 200 further includes environmental sensors 70 providing environmental data, such as time of day, weather, and lighting conditions, to the management unit 10. The management unit 10 integrates data received from the respective data sources, such as the audio/video system 14, locomotive system 30, and the environmental sensors 70, and stores the integrated information in memory 60. The integrated information may include video/audio data, locomotive control data, location data, such as GPS location, and time data. Removable memory 62 may redundantly store the information stored in the memory 60. The removable memory 62 may be removed from the onboard system 200 and installed in compatible devices, such as a download player 66, for accessing the contents stored in the removable memory 62.

In an aspect of the invention, time standard information, for example, received from the navigation system 20 in the form of a time standard encoded in a GPS signal, may be used to synchronize the data received by the management unit 10 from the data sources. For example, the data received from each of the sources may be time stamped with a time tag derived from the GPS time standard. Accordingly, the data may be synchronized to a universal time standard instead of relying on independent time standards applied by the respective data sources to the data that they provide to the management unit 10 that may be asynchronous to one another. By providing a universal time standard for received data, time discrepancies among data received from the different sources having independently encoded time standards may be resolved. In an embodiment, a universal time stamp may be applied to the data by the management unit 10, for example, upon receipt of the data from the respective data sources to generate time correlated integrated information. In another embodiment, a universal time stamp may be provided to each of the respective data sources, such as the audio/video system 14, locomotive system 30, and the environmental sensors 70. The universal time stamp may be used by the respective data sources to time tag data generated by the source before the data is provided to the management unit 10, so that the data received by the management unit 10 arrives with a universal time stamp. In yet another embodiment, universal time information may be provided by other time standard sources, such as a locomotive clock provided by a locomotive communications module unit or an Inter-Range Instrumentation Group (TRIG) time tag generator, to synchronize the data received by the management unit 10.

The on-board system 200 may also include a railroad (RR) landmark database 68 for supplying railroad landmark tags to the management unit 10. The landmark tags may be correlated with the data received from the data sources corresponding to a geographic location of the locomotive, for example, sensed by the navigation system 10, at the time the data is generated. These landmarks tags, such as milepost markers, stations, and crossing tags, may be included in the integrated video data at appropriate geographic correlated locations of data capture to create landmark correlated image data to allow a user to intuitively select landmark tags for retrieving data from the integrated information. For example, instead of using time or geographic location parameters to search the integrated video data, a user may select one or more landmark tags, such as a mile post to locate desired data. By using landmark tags, a user may not need to know a specific time or specific geographic location to search for desired data. Consequently, the landmark tags may be used to provide an alternate means of searching through landmark correlated image data recorded by the management unit 10.

In an aspect of the invention, a landmark tag may be retrieved from the database 68 when location data provided by the navigational system 20 indicates that the locomotive is at a location corresponding to the location of the landmark. The landmark tag may then be inserted into the integrated video data corresponding to the data gathered for the location. In another embodiment, location information from the navigational system 20 may be provided directly to the database 68 so that when the location data indicates that the locomotive is at a location corresponding to the location of a certain landmark, an appropriate landmark tag is provided by the database 68 to the system 10 for incorporation into the integrated video data.

Figures 5, 6:
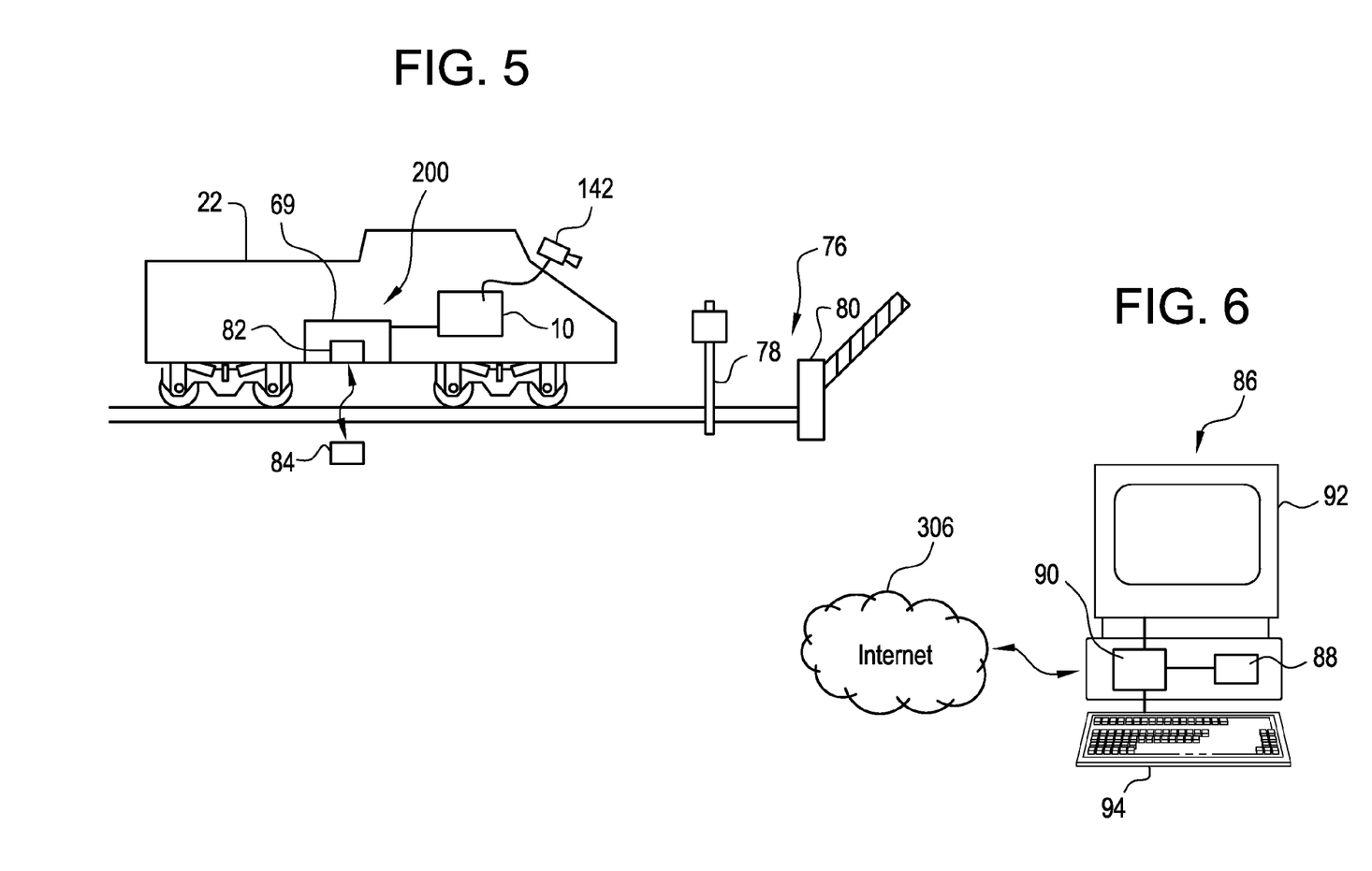
FIG. 5 depicts an exemplary embodiment of the locomotive video recorder and recording system of FIG. 1.
FIG. 6 depicts an exemplary computer system for selecting and retrieving image data.

In yet another aspect of the invention depicted in FIG. 5, the on board system 200 may include a landmark sensor 69 in communication with the management unit 10 for providing landmark tags. The landmark sensor 69 may be configured to detect actual landmarks 76, such as mileposts 78 or crossings 80, proximate the locomotive 22 as the locomotive 22 approaches sufficiently close to the landmark 76 to allow the landmark sensor 69 to detect the actual landmark 76. Actual landmarks 76 detected by the landmark sensor 69 may be incorporated into the integrated information to provide landmark correlated image data. In an embodiment, the landmark sensor 69 may include a transponder reader 82, such as an automated equipment identifier (AEI) tag reader, detecting respective transponders 84, such as AEI tags, positioned proximate the actual landmarks 76 to be detected by a passing locomotive 22.

To reduce the amount of integrated video data needed to be stored, the system 10 may also include a data resolution module 72 for determining a resolution of data to be stored depending on factors such as location, time of day, speed of the locomotive and RR landmarks. For example, higher resolution data than normally acquired, such as a higher video frame rate and/or image quality, may be needed in certain situations, such as if the locomotive is traveling at higher speeds, approaching a crossing or traveling in an urban area. Consequently, lower resolution data than normally acquired, such as a lower video frame rate and/or image quality, may be satisfactory for certain situations, such as when the locomotive is traveling at a slow speed in an undeveloped area along a straight flat rail. Accordingly, data storage capacity may be conserved by reducing the data storage requirements depending on locomotive operating conditions and the environment through which the locomotive is traveling. Based on data received from the data sources, such as the locomotive system 30 and the environmental sensors 70, the data resolution module 72 may dynamically control a resolution of data stored in memory 62. In another embodiment, the data module resolution 72 may be configured to directly control a resolution of data provided by the respective data sources, for example, by changing a mode of operation of the data source, such as a mode of operation of the audio/video system 14.

In another aspect of the invention, the off-board processing center 300 in communication with the on board system 200 via the wireless system 50 may include a system update module 74 for providing system updates to the on board system 200. The system update module 74 may provide system configuration updates controlling, for example, what data is stored and the sample rate of collection of data. The module 74 may also be configured for updating the RR landmark database 68 with new or modified RR landmark tags. System updates may be performed on a periodic basis, and/or as required, such as when new RR landmarks are installed in the railway system. The wireless system 50 may be configured to be compatible with a radio-type communication system, a cellular-type communication system, or a satellite-type communication system. By being configured for different types of communication systems, the most economical communication system may be chosen to provide communications between the on-board system 200 and the off-board processing center 300.

A download device 64, such as laptop, may be connected to the on-board system 200 for downloading information, for example, from memory 60. In an aspect of the invention, the download device 64 may be configured for downloading the entire contents of memory 60, or for downloading desired portions of the information stored in memory 60. The portions desired to be downloaded may be selected based on criteria such as time tags, GPS location, and/or RR landmark tags incorporated in the integrated information by the management unit 10. The download device 64 may be connected to the download player 66 for playing back the information saved on the download device 64. The download player 66 may also be used to play information stored in removable memory 62 when the removable memory 62 is installed in the download player 66, and to play information provided from the off-board processing center 300. The download player 64 may be capable of displaying the integrated information, including data, video, and graphical information, and may further be capable of synching to time tags, location information, and/or RR landmark tags encoded in the integrated information.

In another aspect of the invention, the landmark correlated image data may be stored in a memory device, such as memory 60 onboard the locomotive and/or memory 304 off board the locomotive, for later retrieval and provision to a user desiring to review the landmark correlated image data. The landmark correlated image data may be compressed to optimize storage capacity and transmission bandwidth of landmark correlated image data being transmitted. In an aspect of the invention, the landmark correlated image data may be formatted in a standard video format such as an MPEG or HDTV format.

In an embodiment, the off-board data and monitoring center 300 may include processor 302, in communication with memory 304, configured for receiving the landmark correlated image data from one or more locomotive onboard systems 200, and/or other sources, such as stationary image recording systems, and providing the image data or certain requested portions of the image data to users, for example, via the Internet 306. The off-board data and monitoring center 300 may receive a request over the Internet 306 from a user desiring to view the stored data, for example, corresponding to a certain landmark or geographic location of interest. The requesting user may select the desired portion of the image data to be viewed by specifying a landmark location, such as one or more mileposts. The processor 302 responds to the request by accessing the image data, for example, stored in memory 304, to retrieve image data associated with the specified milepost or mileposts. Accordingly, a user more familiar with landmark locations, for example, as opposed to geographic coordinates, may be able to more easily request desired landmark correlated image data to be viewed by selecting a desired landmark or landmarks. In addition, the user may be able to select image data by time tags, for example, to bracket a desired time period of image data to be viewed.

In another aspect, image data acquired by various different sources, such as locomotive mounted cameras, stationary cameras, or other sources, may be organized according to common imaging locations and stored, such as in memory 304. Accordingly, a user requesting image data corresponding to a certain landmark, such as a vicinity of a certain milepost, may be provided with image data recorded in the vicinity of the landmark recorded by different imaging systems.

As depicted in FIG. 6, a computer system 86 for accessing the landmark correlated image data by landmark location may include an input device 94, such as a keyboard, for selecting landmark correlated image data by landmark location, provided, for example, via the internet 306. The computer system may include a storage device 88, such as a memory, storing a computer code for accessing the landmark correlated image data to retrieve selected landmark correlated image data according to landmark location. A central processing unit (CPU) 90 responsive to the input device 94, operates with the computer code stored in the storage device 88 to retrieve selected landmark correlated image data, such as over the Internet 306, and an output device 92, such as a monitor, provides selected landmark correlated image data to a user.

Based on the foregoing specification, the methods described may be implemented using computer programming or engineering techniques including computer software, firmware, hardware or any combination or subset thereof, wherein the technical effect is to provide an imaging system for generating landmark correlated images taken, for example, from a railroad locomotive. Any such resulting program, having computer-readable code means, may be embodied or provided within one or more computer-readable media, thereby making a computer program product, i.e., an article of manufacture, according to the invention. For example, computer readable media may contain program instructions for a computer program code for processing received imaging data indicative of images acquired in a vicinity of a locomotive. The computer readable media may also include a computer program code for processing received location data indicative of a geographic location of the locomotive when the images are being acquired. In addition, the computer readable media may include a computer program code for accessing a railroad landmark database comprising a plurality of railroad landmarks associated with respective geographic locations constituting landmark tags to correlate the landmark tags with the imaging data and the location data to generate landmark correlated image data.

The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An imaging system comprising:
a camera configured to generate video data associated with a rail vehicle; and
one or more processors configured to control continuously recording of the video data according to at least one of a variable frame rate or a variable resolution that changes as operating conditions of the rail vehicle change, the one or more processors configured to increase the at least one of the variable frame rate or the variable resolution responsive to the operating conditions of the rail vehicle increasing and to decrease the at least one of the variable frame rate or the variable resolution responsive to the operating conditions of the rail vehicle decreasing.

2. The imaging system according to claim 1, further comprising a data storage device configured to store the video data for later retrieval.

3. The imaging system according to claim 1, wherein the operating conditions of the rail vehicle comprise one or more of a time of day that the video data is generated or recorded, or environmental conditions experienced by the rail vehicle.

4. The imaging system according to claim 1, wherein the one or more processors are configured to control recording of the video data by increasing at least one of the variable frame rate or the variable resolution of the video data responsive to a speed of the rail vehicle increasing, and wherein the one or more processors are configured to control recording of the video data by decreasing at least one of the variable frame rate or the variable resolution of the video data responsive to the speed of the rail vehicle decreasing.

5. The imaging system according to claim 1, wherein the one or more processors are configured to control recording of the video data by increasing at least one of the variable frame rate or the variable resolution responsive to the rail vehicle approaching a crossing, and wherein the one or more processors are configured to control recording of the video data by decreasing at least one of the variable frame rate or the variable resolution if responsive to the rail vehicle not approaching the crossing.

6. Non-transitory computer readable medium with instructions that, when executed by one or more processors, cause the one or more processors to control continuously recording of video data associated with a rail vehicle at one of a variable frame rate or a variable resolution that changes as operating conditions of the rail vehicle change, the instructions also causing the one or more processors to increase the at least one of the variable frame rate or the variable resolution responsive to the operating conditions of the rail vehicle increasing, the instructions also causing the one or more processors to decrease the at least one of the variable frame rate or the variable resolution responsive to the operating conditions of the rail vehicle decreasing.

7. The non-transitory computer readable medium with instructions according to claim 6, wherein the instructions cause the one or more processors to control storing the video data for later retrieval.

8. The non-transitory computer readable medium with instructions according to claim 6, wherein the instructions cause the one or more processors to control a camera associated with the rail vehicle to generate the video data.

9. A method comprising:
generating video data associated with a rail vehicle with a camera attached to the rail vehicle; and
controlling recording of the video data according to at least one of a variable frame rate or a variable resolution based on operating conditions of the rail vehicle, while the video data is being continuously generated, such that the at least one of the variable frame rate or the variable resolution increases responsive to the operating conditions of the rail vehicle increasing and such that the at least one of the variable frame rate or the variable resolution decreases responsive to the operating conditions of the rail vehicle decreasing, wherein the recording is controlled by one or more processors.

10. The method according to claim 9, further comprising storing the video data for later retrieval.

11. The method according to claim 9, comprising:
increasing the at least one of the variable frame rate or the variable resolution of the video data responsive to a speed of the rail vehicle increasing; and
decreasing the at least one of the variable frame rate or the variable resolution of the video data responsive to the speed of the rail vehicle decreasing.

12. The method according to claim 9, comprising:
increasing the at least one of the variable frame rate or the variable resolution of the video data responsive to the rail vehicle approaching a crossing; and
decreasing the at least one of the variable frame rate or the variable resolution of the video data responsive to the rail vehicle not approaching the crossing.

13. The imaging system of claim 3, wherein the environmental conditions include one or more of weather conditions, topology of the track being traversed by the rail vehicle, or elevation of the rail vehicle.

14. The imaging system of claim 1, wherein the one or more processors are configured to direct communication of the video data to an off-board location based on the operating conditions.

15. The imaging system of claim 1, wherein the one or more processors are configured to direct communication of the video data to an off-board location responsive to the rail vehicle at least one of approaching or reaching a designated location other than the off-board location.

16. The imaging system of claim 1, wherein the one or more processors are configured to include landmark tags in the video data at geographic locations of the rail vehicle that correlate to the video data generated at the geographic locations, the landmark tags indicative of landmarks along a track being traversed by the rail vehicle.

17. The method of claim 9, wherein the operating conditions of the rail vehicle comprise one or more of a time of day that the video data is generated or recorded, or environmental conditions of the rail vehicle, the environmental conditions including one or more of weather conditions, topology of the track being traversed by the rail vehicle, or elevation of the rail vehicle.

18. The method of claim 9, further comprising communicating the video data to an off-board location based on the operating conditions.

19. The method of claim 9, further comprising communicating the video data to an off-board location responsive to the rail vehicle at least one of approaching or reaching a designated location other than the off-board location.

20. The method of claim 9, further comprising inserting landmark tags in the video data at geographic locations of the rail vehicle that correlate to the video data generated at the geographic locations, the landmark tags indicative of landmarks along a track being traversed by the rail vehicle.

* * * * *

UNITED STATES PATENT AND TRADEMARK OFFICE
CERTIFICATE OF CORRECTION

Page 1 of 2

PATENT NO. : 8,913,131 B2
APPLICATION NO. : 13/109209
DATED : December 16, 2014
INVENTOR(S) : Chung et al.

It is certified that error appears in the above-identified patent and that said Letters Patent is hereby corrected as shown below:

On the Title Page, in Column 1, below "Related U.S. Application Data", delete item "(60)" and insert item -- (62) --, therefor.

In the Drawings

In Fig. 4, Sheet 4 of 5, delete "Enviroment Data" and insert -- Environment Data --, therefor.

In Fig. 4, Sheet 4 of 5, for Tag "70", in Lines 1-2, delete "Enviroment Sensors" and insert -- Environment Sensors --, therefor.

In the Specification

In Column 1, Line 7, delete "application" (Second Occurrence) and insert -- U.S. application --, therefor.

In Column 2, Line 30, delete "system." and insert -- system; --, therefor.

In Column 2, Line 32, delete "FIG. 1." and insert -- FIG. 1; --, therefor.

In Column 10, Line 36, delete "(TRIG)" and insert -- (IRIG) --, therefor.

In Column 10, Line 43, delete "system 10," and insert -- system 20, --, therefor.

In Column 11, Line 2, delete "system 10" and insert -- system 20 --, therefor.

In Column 11, Line 21, delete "system 10" and insert -- system 20 --, therefor.

Signed and Sealed this
Ninth Day of June, 2015

Michelle K. Lee
*Director of the United States Patent and Trademark Office*

CERTIFICATE OF CORRECTION (continued)
U.S. Pat. No. 8,913,131 B2

In Column 12, Line 12, delete "player 64" and insert -- player 66 --, therefor.

In the Claims

In Column 14, Line 31, in Claim 5, delete "resolution if" and insert -- resolution --, therefor.

In Column 14, Line 33, in Claim 6, delete "Non-transitory" and insert -- A non-transitory --, therefor.